(12) United States Patent
Gupta et al.

(10) Patent No.: US 7,673,077 B2
(45) Date of Patent: Mar. 2, 2010

(54) MULTI-PROTOCOL ISCSI DEVICE DISCOVERY FOR ON DEMAND DEVICE ENUMERATION

(75) Inventors: Sumit Gupta, Newark, CA (US); David C. Weibel, Niwot, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 657 days.

(21) Appl. No.: 11/371,855

(22) Filed: Mar. 9, 2006

(65) Prior Publication Data

US 2007/0226360 A1   Sep. 27, 2007

(51) Int. Cl.
*G06F 3/00* (2006.01)
(52) U.S. Cl. ............... 710/8; 710/3; 710/9; 710/10; 710/33; 710/62
(58) Field of Classification Search ............... 710/3, 710/8, 9, 10, 11, 17, 33, 62
See application file for complete search history.

(56) References Cited

U.S. PATENT DOCUMENTS

| 6,574,664 B1* | 6/2003 | Liu et al. ............... 709/224 |
| 2002/0124094 A1* | 9/2002 | Chang et al. ............ 709/230 |
| 2004/0083285 A1* | 4/2004 | Nicolson ............... 709/224 |
| 2006/0041612 A1* | 2/2006 | Doshi et al. ............ 709/202 |
| 2007/0055838 A1* | 3/2007 | Mitsuoka et al. ......... 711/164 |

* cited by examiner

*Primary Examiner*—Tariq Hafiz
*Assistant Examiner*—Jasjit S Vidwan
(74) *Attorney, Agent, or Firm*—Marsh Fischmann & Breyfogle LLP; Jonathon A. Szumny; Kent A. Lembke

(57) ABSTRACT

A target discovery manager associated with a target discovery layer is interposed between a host initiator and one or more discovery protocols. The target discovery manager maintains a list of target devices found by each of several target discovery protocols. For each discovered target device listed, the associated discovery protocols that discovered the target device are prioritized and coalesced into a single enumerated target device register. The target device register provides the host initiator with a single list of known target devices produced from multiple discovery protocols with the discovery protocols that independently discovered each device prioritized according to various parameters.

20 Claims, 7 Drawing Sheets

MULTI-PROTOCOL ISCSI DEVICE DISCOVERY FOR ON DEMAND DEVICE ENUMERATION

BACKGROUND OF THE INVENTION

1. Field of the Invention

The present invention relates, in general, to iSCSI storage area networks, and, more particularly, to software, systems and methods for the discovery, enumeration and management of target devices in an iSCSI storage area network.

2. Relevant Background

A storage system is a computer that provides storage service relating to the organization of information on writable persistent storage devices, such as memories, tapes or disks. Such a storage system is commonly deployed within a storage area network (SAN) or a network attached storage (NAS) environment.

A SAN is a high-speed network that enables establishment of direct connections between a storage system and its storage devices. The SAN may thus be viewed as an extension to a storage bus and, as such, an operating system of the storage system that enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC protocol (FCP) or Internet Protocols (IP) creating what is known as an Internet Small Computer Systems Interface (iSCSI). A SAN arrangement or deployment allows decoupling of data storage from the storage system, such as an application server, and some level of information storage sharing at the application server level. There are, however, environments wherein a SAN is dedicated to a single server and accessed via network protocols. iSCSI SANs often encounter such an environment. iSCSI therefore combines SCSI commands and protocols for storage, IP protocols for networking, and transfer protocols to enable data transfer, each of which are briefly described below.

Transfer communication protocols (TCP) enable data transfer to occur between a host and a target. Transfer protocols locate an appropriate target device, interpret application commands, translate them into commands understood by the target and move data between the device and system memory.

Networking protocols define the way information is transferred between hosts and targets in a network. Depending on the configuration and application, data is transferred as either files or blocks. For file transfers, one commonly used protocol is the MICROSOFT WINDOWS® system Server Management Block/Common Internet File System protocol. UNIX/LINUX® alternatively uses a Network File System protocol for the same purposes. Other protocols for file/block transfer will be apparent to one skilled in the art in the context of the present invention.

Storage protocols, such as SCSI, use block level data transfer to move information from one system to another resulting in the data being transferred in a format native to storage devices rather than application and operating systems.

iSCSI therefore merges the well established networking protocol entitled Transfer Control Protocol/Internet Protocol (TCP/IP) with the ubiquitous SCSI storage protocol and defines the rules for transporting block level data across TCP/IP based networks. Storage devices store data in block form. The block level data is transferred within a computer system to a storage medium via a Host Bus Adapter (HBA), a storage controller, or a network adapter.

In an iSCSI SAN system, regardless of the arrangement, access to data is initiated via a host node which is also known as an iSCSI initiator. When an iSCSI initiator connects to an iSCSI target, the storage is seen by the server operating system or host as a local SCSI device that can be formatted as usual. The underlying storage is transparent to applications and operating systems. An initiator can be an iSCSI driver (software) with a standard network card or a card (hardware) with a TCP offload engine (TOE), which reduces Central Processing Unit (CPU) utilization. (Host bus adaptors (HBAs) that offload both TCP and iSCSI are also available.) The primary difference between the iSCSI device and a network card lies in whether the CPU or a processor source on the card performs the fundamental tasks of decoding/encoding.

To gain access to the stored data, the host node must access information about each target device where the data is housed in what is called a discovery process. Once found, the host initiator must enumerate and keep track of the discovered target devices so as to know where to find particular repositories of data.

There are several ways by which to accomplish target device discovery. These means of discovery include Host Based Static Discovery, SendTargets commands, Service Locator Protocol (SLP) multicast discovery (SLP, Directory Agent (DA), etc.), Dynamic Host Communication Protocol (DHCP), Internet Storage Name Service (iSNS) query, iSNS state change notification, and several vendor specific utilities.

Host based Static discovery assumes that the Internet Protocol address, Transfer Communication Protocol, and the iSCSI target name information are already available to the initiator. The initiator performs no active discovery in this scenario. To establish an iSCSI session the initiator uses the known IP address and TCP port information to establish a connection. While convenient for small iSCSI situations, static discovery has limited applicability for growing SANs or situations where address information must be frequently updated.

SendTargets is a command used to provide an initiator with information pertaining to the targets located at a particular IP address. This command assumes that target address and TCP port information of some Network Entity is known by the initiator but that other targets associated with that entity are either unknown or have changed since the last query. A SendTarget command retrieves information regarding these other targets.

Finally zero configuration techniques such as SLP, DA and iSNS assume that the initiator does not have any information about the targets. The initiator multicasts discovery messages to the targets or storage servers to gain information about what exists in the SAN. While clearly the most versatile and comprehensive in its approach, this discovery means is correspondingly expensive from a processing time point of view to operate.

Each target that is discovered possesses a unique IP address, unique communication protocol, iSCSI names, etc. Furthermore, as the means by which a particular target is discovered may differ, the information may be presented to the initiator in differing formats. In addition two or more discovery methods may identify the same target, yet convey pertinent information regarding that target to the initiator differently. It may also be possible to communicate with the same target using a host network adapter. Finally the host operating system may approach iSCSI discovery differently at a fundamental level. Some operating systems approach discovery using an "on demand" approach while others "seek out" targets even when demand is absent.

The resulting hybrid of situations produces an inconsistent discovery environment where any one particular host may or may not know the extent of a particular SAN's availability. Furthermore the management of the various protocols needed to access known (or yet to be known) targets is daunting. What is needed are computer-implemented methods, computer systems and computer-readable media to provide a common means for accomplishing iSCSI discovery capable of directing and managing the differing iSCSI discovery approaches and protocols that is both scalable and platform independent.

SUMMARY OF THE INVENTION

Briefly stated, the present invention involves computer implemented methods, systems, and computer media for the discovery and enumeration of target device(s) in an iSCSI storage area network. A target discovery manager associated with a target discovery layer is interposed between a host initiator and one or more discovery protocols. In one embodiment of the present invention, the target discovery manager maintains a list of target devices found by each of several discovery protocols. For each discovered target device listed the associated discovery protocols are prioritized and coalesced into a single enumerated target device register. The target device register provides to the host initiator a single list of known target devices produced from multiple discovery protocols with the discovery protocols that independently discovered the device prioritized according to various parameters.

In another aspect of the present invention the target discovery manager receives a request from a host initiator for target discovery protocols for a specific target. The target discovery manager then compares the list of known target devices to the discovered device to determine whether the device is known and if so, what are appropriate discovery protocols associated with that device. When the requested target is present on the register, the target discovery manager provides the initiator with the prioritized list of discovery protocols associated with that target device. When the target device is absent from the register, the target discovery manager initializes one or more of the available discovery protocols to find the sought after device.

In yet another aspect of the present invention, the target discovery manager initiates, either periodically or by special request, a general device discovery using all of the available discovery protocols and then maintains a list of known target devices for use by an initiator. Results of each discovery protocol are coalesced and protocols associated with each target device prioritized.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter. Resort to the claims as being necessary to determine such inventive subject matter.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
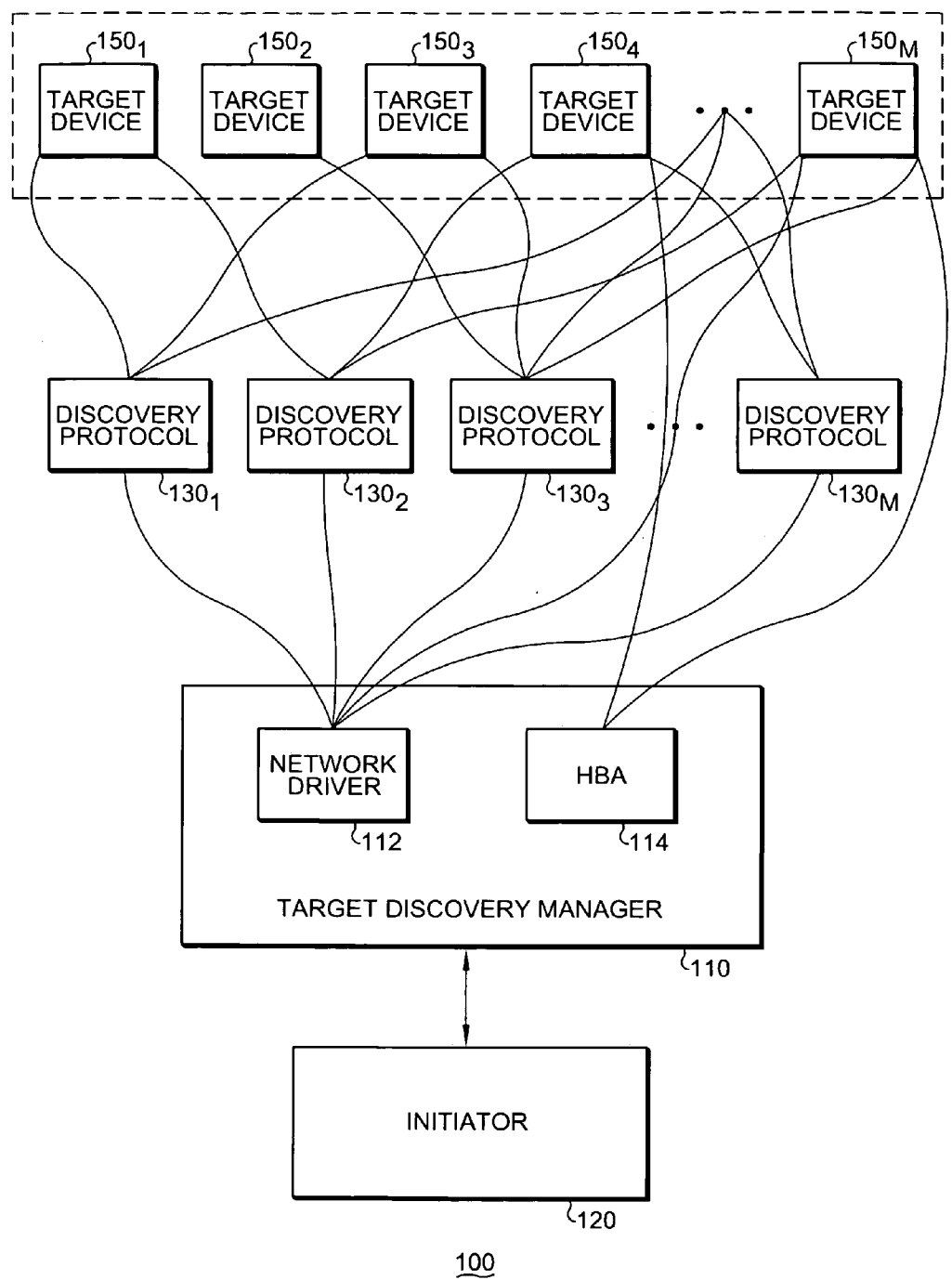
FIG. 1 shows a high level block diagram of a computer system for target discovery and enumeration in an iSCSI storage area network in which one embodiment of the present invention is implemented.

The present invention is illustrated and described in terms of aforementioned figures and the following text. FIG. 1 illustrates a high level block diagram of a computer system 100 for target discovery and enumeration in an iSCSI storage area network. A target discovery manager 110 is interposed between and in communication with a host initiator 120 and a Storage Area Network (SAN) through a network such as the Internet. The SAN is comprised of one or more target devices $150_1, 150_2, \ldots 150_m$ that are discovered by the host initiator 120 through discovery protocols $130_1, 130_2, \ldots 130_n$. Each device 150 discovered by one or more discovery protocols 130 further comprises additional undiscovered target devices (not shown).

It is to be understood that although the target discovery manager 110 is illustrated as a single entity, as the term is used herein a target discovery manager 110 refers to a collection of functionalities which can be implemented as software, hardware, firmware or any combination of these. Where the target discovery manager is implemented as software, it can be implemented as a standalone program, but can also be implemented in other ways, for example as part of a larger program, as a plurality of separate programs, as one or more device drivers or as one or more statically or dynamically linked libraries. A target discovery manager 110 can be instantiated on and/or as part of a server, client, proxy, gateway, switch and/or any combination of these and/or other computing devices and/or platforms.

As is shown in FIG. 1, the target discovery manager 110 is interposed between an initiator 120 and the storage area network associated with an iSCSI network. The target discovery manager 110 operates to manage and place discovery protocol functionality at a level independent of the host initiator 120. Once a target device 150 is selected by the initiator 120 the target discovery manager 110 manages the various discovery and connection protocols such that the host initiator 120 will have no knowledge of the protocols used to connect it with its desired target.

As mentioned, the discovery protocols 130 that identify target devices 150 within a SAN vary widely in both methodology and capability and each discovery protocol 130 possesses advantages and disadvantages. Some discovery protocols include Host Based Static Discovery, SendTargets commands, Service Locator Protocol (SLP) multicast discovery (SLP, Directory Agent (DA), etc.), Dynamic Host Communication Protocol (DHCP), Internet Storage Name Service (iSNS) query, iSNS synchronization notification, and several vendor specific utilities. These and other implementation methodologies for discovering target device(s) can be successfully utilized by the target discovery manager 110. These implementation methodologies are known within the art and the specifics of their application within the context of the present invention will be readily apparent to one of ordinary skill in the relevant art in light of this specification.

Typically the varying level of complexity and size of the SAN determines what discovery protocol 130 is best suited. Unfortunately there is not a single protocol that provides a comprehensive and efficient means by which to discover each and every target device 150 within any SAN. The capabilities of discovery protocols 130 vary widely yet still overlap and one or more discovery protocols 130 may discover the same target 150 with albeit different configurations. Managing discovered target devices 150 and its associated discovery protocols, as well as providing a user with an efficient means by which to choose among the various discovery protocols 130, is an object of this invention.

The target discovery manager 110 functions to coalesce target devices discovered through multiple discovery protocols into a register of discovered target devices and sets priorities among the protocols to use when one or more of the listed target devices 150 is requested by the host initiator 120. For example and as shown in FIG. 1, discovery protocol $130_1$, has identified target devices $150_1$, $150_3$, and $150_5$. Similarly discovery protocol $130_2$ has identified target devices $150_1$, $150_4$, and $150_m$ The target discovery manager 110 coalesces the discovery of target devices $150_1$, $150_3$, $150_4$, $150_5$, and $150_m$ with the appropriate discovery protocol 130 into the register as well as associates target devices $150_1$ with both discovery protocol $130_1$ and discovery protocol $130_3$. Based on pre-determined and user supplied inputs, according to one embodiment of the present invention, the target discovery manager 110 prioritizes the two discovery protocols 130 associated with target device 150, to provide the initiator 120 the most efficient connection configuration. As discussed subsequently in further detail, the last protocol used to discover a target is set, in one embodiment of the present invention, as the preferred protocol for that target device 150.

Another function of the target host manager 110 is to enable parallel discovery. The target discovery manager 110 provides the user with a multi-discovery protocol means by which to initiate a target discovery when a desired target's location is not known or maintained in the register of enumerated target devices. While several discovery protocols 130 are available and likely known to one skilled in the art, the present invention provides the initiator 120 with the means to identify a desired target to the target discovery manager 120 and allow the target discovery manager to simultaneously initialize several discovery protocols at once so as to discover the requested target device 150 as quickly and as efficiently as possible. The present invention thus provides a clear way to map host side enumerations of devices 150 to different iSCSI discovery protocols 130. Prior to the present invention, an initiator 120 would seek discovery of a desired target by serially and randomly operating one or more of the known discovery protocols 130 making the efficiency of the selected connection protocol suspect.

While FIG. 1 shows the target discovery manager 110 being separate from the initiator and as a single entity, other embodiments of the present invention may depict the target discovery manager 110 as several distinct portions or modules that interoperate to perform the described functionality of the target discovery manager. Furthermore, other embodiments of the target discovery manager 110 may locate one or all of the portions of the target discovery manager 110 at the initiator while in other embodiments specific functions of the target discovery manager 110 may be placed throughout the iSCSI SAN network without diminishing the target discovery manager's 110 functionality.

Similarly, FIG. 1 depicts the initiator communicating with the SAN through a network via a host network adapter 112 or through a host bus adapter 114, but the functionality of the present invention is equally adaptable and can be implemented using any means of communication with an iSCSI SAN. Note that while the connection to the target devices 150 appears to bypass the discovery protocols 130, the reader will appreciate that the host bus adaptor 114 internally possesses discovery protocols $130_1$-$130_n$.

Figure 2:
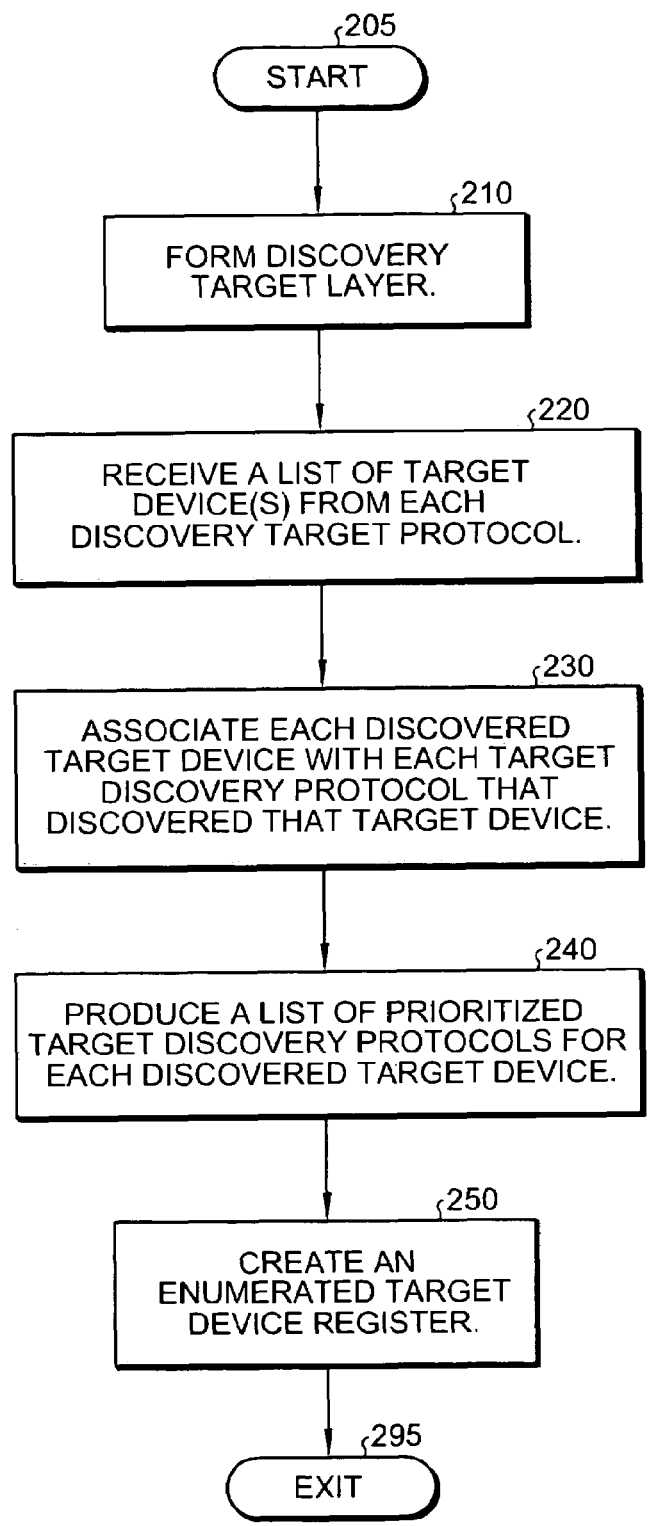
FIG. 2 shows a flow diagram for target discovery and enumeration in an iSCSI storage area network according to one embodiment of the present invention.

FIG. 2 shows high level flow diagram for target discovery and enumeration in an iSCSI storage area network. FIG. 2 discloses the formation 210 of a discovery target layer that is distinct from the protocol layer housing the various target discovery protocols 130 and the host system that functions as the initiator 120. Once formed, the discovery target layer houses the discovery target manager 110 which receives 220 from each discovery protocol 130 a list of target devices 150 that have been discovered by that discovery protocol 130. Each discovered target device 150 is added to a single list wherein each discovered target device is associated 230 with at least one discovery protocol 130. Target devices 150 associated with more than one discovery protocol are coalesced and the protocols prioritized 240 to create 250 an enumerated prioritized register of discovered target devices 150.

Figure 3:
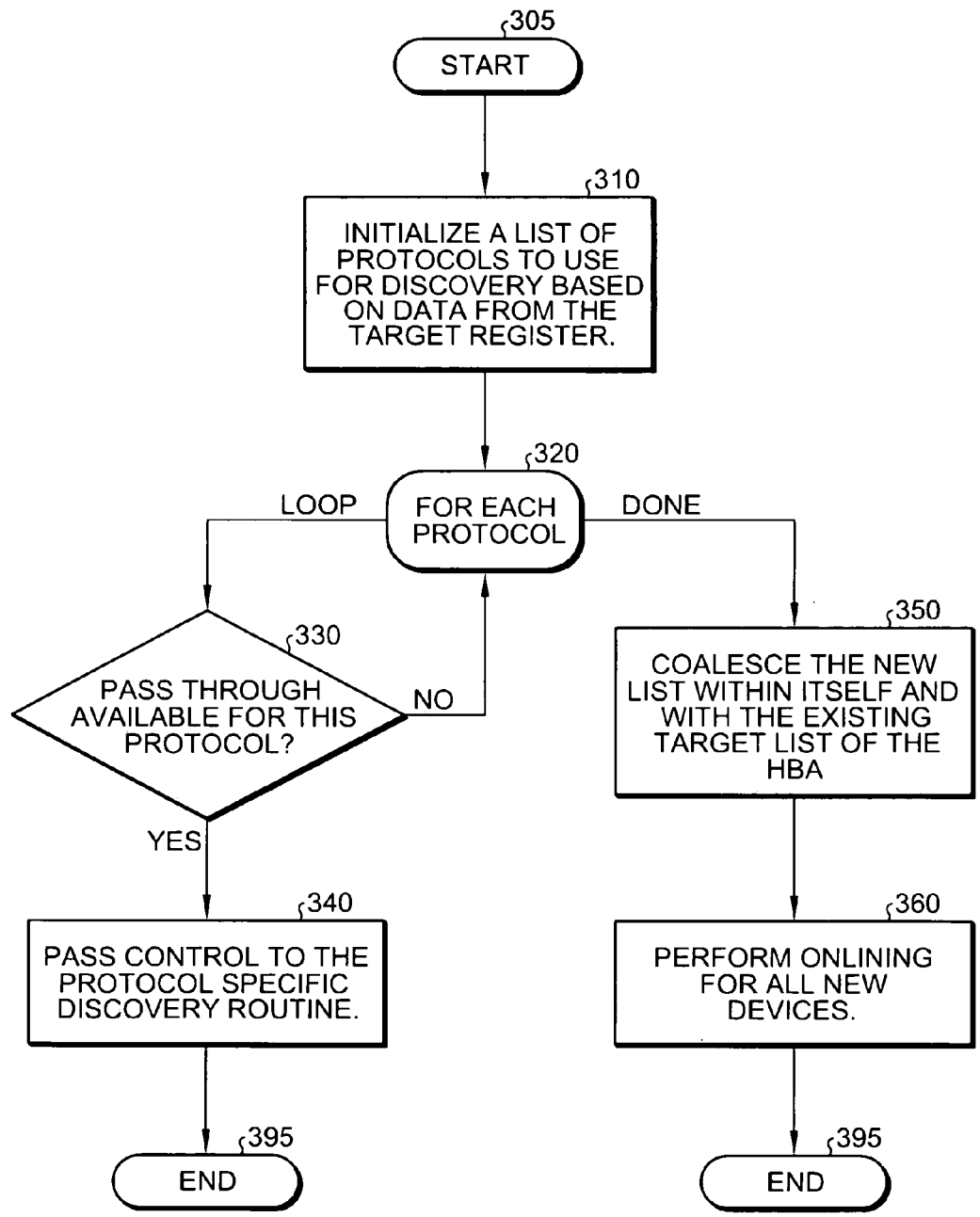
FIG. 3 shows a flow diagram for target discovery and enumeration of discovered targets according to one embodiment of the present invention.

FIG. 3 shows a flow diagram for target discovery and enumeration of discovered targets through a host bus adaptor based on data present in the target register according to one embodiment of the present invention. As previously discussed, several known target devices 150 may themselves be linked to several other unknown targets and storage repositories. For example, a known target 150 may generally possess data concerning various simulations of test equipment and maintain a list of other targets possessing the individual test runs and detailed data. Thus a user may wish to gain a more detailed listing of data from targets associated with the known target. Upon receiving a request for access to or for more information about specific targets 150 or set of targets, the target discovery manager 110 initializes 310 a list of protocols 130 to use for discovery based on data available to the target discovery manager 110. This data includes among other things the enumerated target register and prioritized list of discovery protocols. Once initialized 310, a loop 320 is begun for each discovery protocol 130 associated with a known target 150 beginning, in one embodiment, with the protocol having the highest priority.

The known target 150 is re-discovered using the appropriate discovery protocols and queried 330 to determine if that specific target 150 and the applicable discovery protocol 130 supports pass-through. Pass-through for a given protocol enables the host bus adapter 114 to allow a high level entity such as the target discovery manager 110 to accomplish device discovery on its behalf. In situations where pass-through is not available the host bus adapter 114 will perform device discovery itself and provide a list of discovered devices to the target discovery manager 110.

Each discovery protocol 130 associated with a known target device 150 is initialized and the data gained from each protocol coalesced 350 into existing HBA data housed by the target discovery manager 110. In one embodiment of the present invention the HBA resorts to a default discovery protocol list of Static, SendTargets, iSNS, and HBA internal discovery. Upon all of the target devices 150 being identified and listed by the target discovery manager 110, each new target is "on-lined" 360 or contacted so as to be made available to the host initiator via the target discovery manager 110.

Figure 4A:
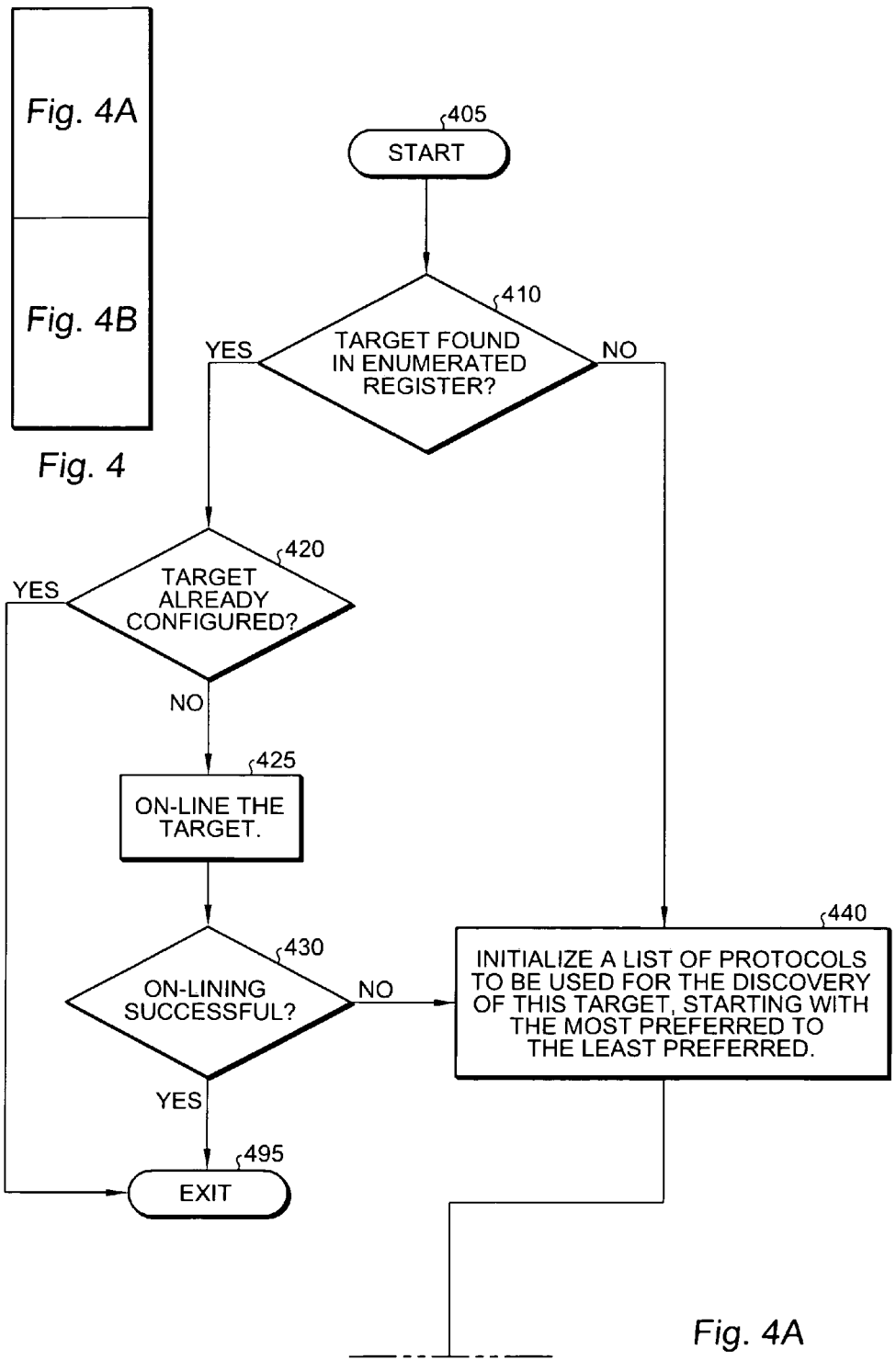
FIG. 4 shows a flow diagram for target discovery and enumeration of undiscovered targets according to one embodiment of the present invention.
Figure 4B:
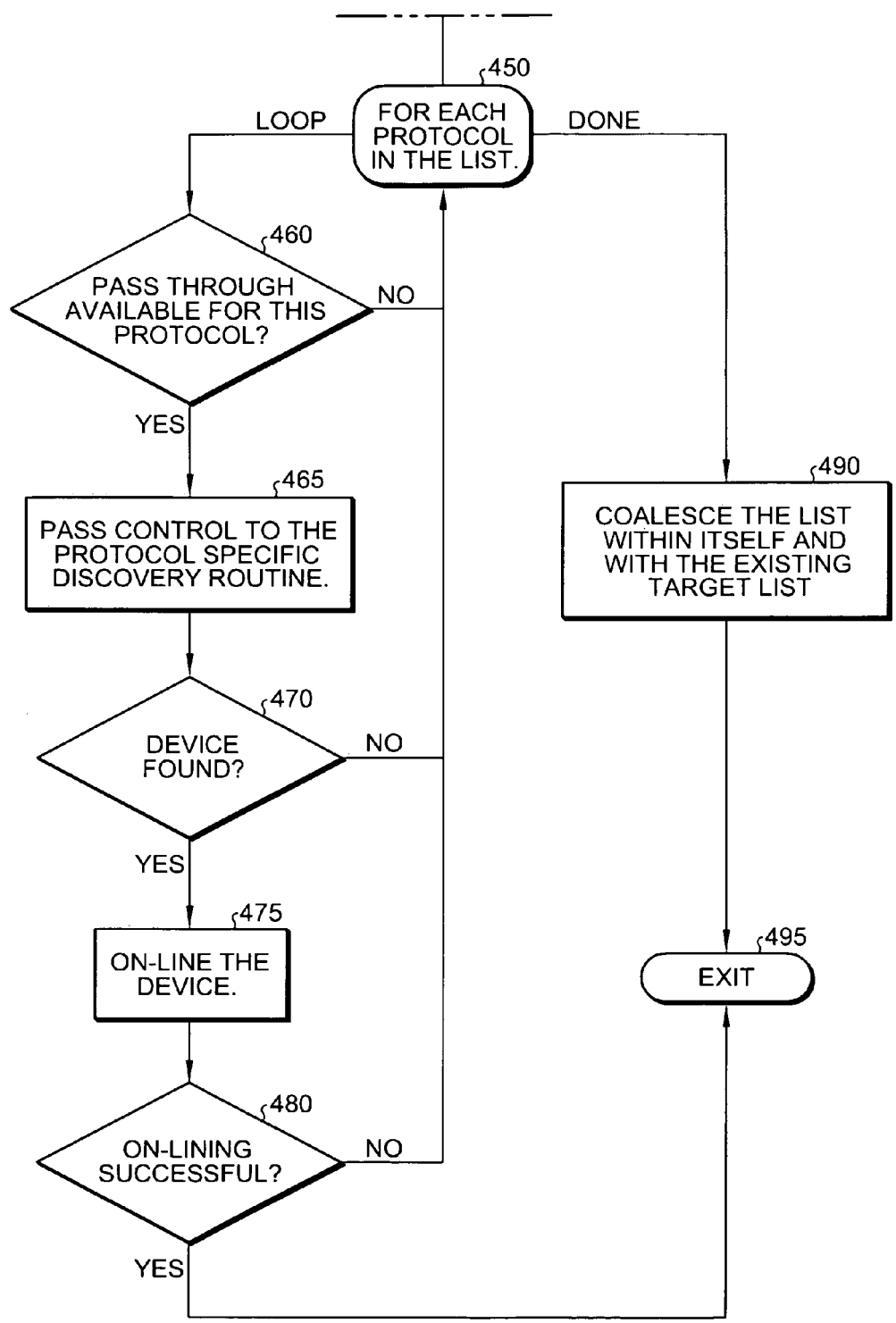

When a user initiates a request for a target 150 not present in the target register, the target discovery manager 110 initiates steps to discover the target using a variety of discovery protocols 130. A flow diagram of one embodiment for discovering targets that are not present in the data maintained by the target discovery manager 110 is shown in FIG. 4. Upon receiving a request from the initiator 120, the target discovery manager 110 determines 410 if the requested target is present in the enumerated target register. When the target is present and known, the target discovery manager 110 establishes 420 whether the target device 150 is configured for communication with the initiator 120 via on-lining the target. When configuration data is present, the target discovery manager 110 facilitates a connection between the initiator 120 and the selected target 150. When the target is known but not configured, the target discovery manager 110 on-lines 425 the target 150 and the initiator 120 so that they are properly configured for communication and data transfer.

When the desired target device 150 is not found in the enumerated target register or in any data maintained by the target discovery manager 110, or when on-lining 430 of the target is unsuccessful (indicating one or more contact parameter has changed) the target discovery manager 110 initiates a discovery process 440 by initializing a list of discovery protocols beginning with the most preferred. The preference order, in one embodiment of the present invention, may be pre-determined, while in another embodiment the target discovery manager may determine a protocol priority based on factors such as the general characteristics of the requested target device. Nonetheless, once the protocols have been initialized and prioritized, each protocol in the list of protocols is run in a loop 450 in an effort to locate the requested target.

As discussed with reference to FIG. 3, the discovery process associated with each protocol examines whether the entity allows 460 pass-through discovery. In situations where pass-through discovery is allowed, device discovery 465 is passed to the target discovery manager 110 so as to determine whether the requested target device 150 can be found. When the device is found, an attempt is made thereafter to on-line the device. When the on-lining is successful, the appropriate data is added 490 to the enumerated target registry maintained by the target discovery manager 110. When the target device is not found or the on-lining is unsuccessful, the target discovery manager 110 steps the loop 450 to the next discovery protocol 130. The process continues until all available protocols in the prioritized list have been initiated and/or the target is located and on-lined.

Figure 5A:
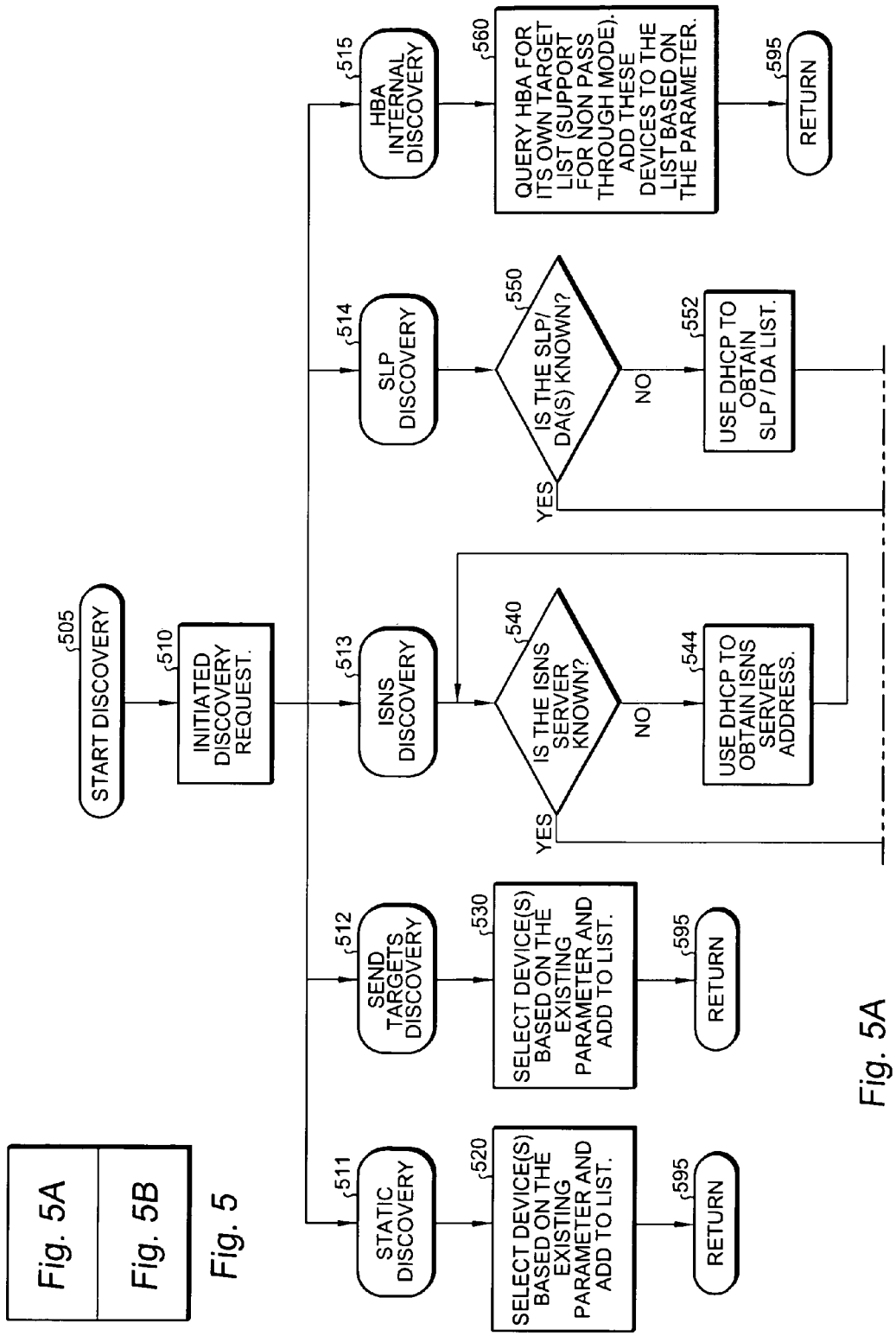
FIG. 5 shows a flow diagram of a plurality target discovery protocols used for general target discovery and enumeration in an iSCSI storage area network environment.
Figure 5B:
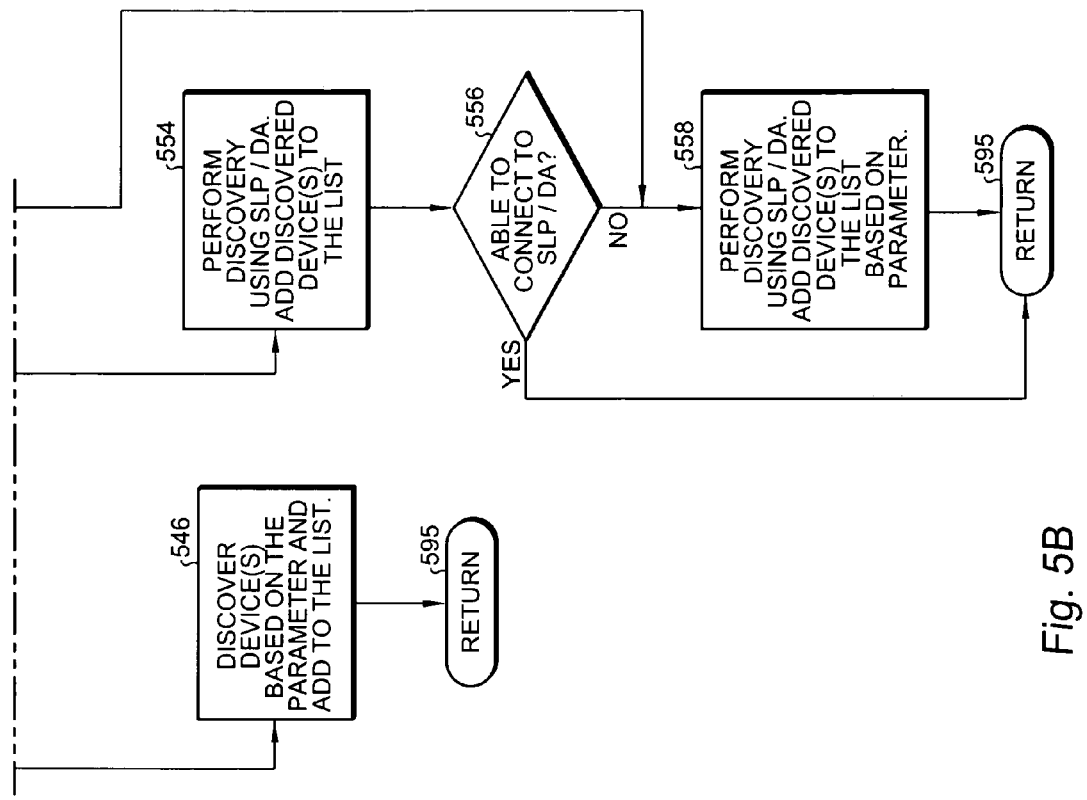

Another embodiment of the present invention enables the target discovery manager 110 to seek out and generally discover target devices 150 on a broader scale with or without a specific initiator request. FIG. 5 shows a flow diagram according to one embodiment of the present invention for conducting a multi-protocol target discovery. Upon receiving a command 510 to initiate a general target discovery, the target discovery manager 110 initializes all of the available discovery protocols 130 known to the target discovery manager 110. The command to initiate the discovery may be initiated by a host 120 or by the target discovery manager 110 itself. In one embodiment of the present invention, the target discovery manager 110 periodically initiates a general target discovery process that is de-conflicted with other CPU processes so as not to impact pending or ongoing system operations. In another embodiment of the present invention, the target discovery manager 110 initiates an ongoing discovery crawler what operates in the host system's background to ensure the enumerated target register is maintained with the most complete and up to date data possible.

The embodiment shown in FIG. 5 depicts a flow diagram for a general target discovery wherein the target discovery manager is aware of and maintains five discovery protocols. Once the discovery is initiated 510, each discovery protocol available to the target discovery manager 110 such as static discovery 511, SendTargets discovery 512, iSNS discovery 513, SLP discovery 514, and HBA internal discovery 515 is initialized. The static 511 and SendTargets 512 discovery protocols discover 520, 530 various devices according to their respective protocols and add them to the list maintained by the target discovery manager 110. iSNS discovery protocol 513 first inquires whether the iSNS server is known 540. When the server address is not known, the iSNS discovery protocol uses 544 Dynamic Host Configuration Protocol (DHCP) to obtain the iSNS server address. Once the iSNS server address is known, device(s) are discovered 546 according the iSNS protocol and its governing parameters. Device(s) discovered are also added to the list maintained by the target discovery manager 110.

In a similar manner, the SLP discovery protocol 514 begins the discovery process by inquiring 550 whether the SLP/DA list is known. When the SLP/DA list is known, discovery of device(s) associated with the list is accomplished according to SLP/DA protocols. Device(s) discovered are subsequently added 554 to the list maintained by the target discovery manager 110. Once a target device 150 is discovered using a SLP/DA protocol, the target discovery manager 110 then attempts to connect with that device 558 to determine if additional devices are accessible. When the SLP/DA list is not known 550, discovery is again performed 558 using SLP/DA. Device(s) subsequently discovered also are added to the list maintained by the target discovery manager 110. When a connection cannot be accomplished, the SLP discovery protocol 514 is terminated.

Lastly, internal host bus adapter discovery 515 is initiated by the target discovery manager 110. A query 560 is made by the target discovery manager 110 for any HBA target lists. Target devices known through the HBA are also added to the list of known or discovered targets by the target discovery manager 110.

Although the invention has been described and illustrated with a certain degree of particularity, and in some instances with reference to a preferred embodiment, it is understood that the present disclosure has been made only by way of example, and that numerous changes in the combination and arrangement of parts can be resorted to by those skilled in the art without departing from the spirit and scope of the invention, as hereinafter claimed.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer implemented method for target discovery and enumeration in an iSCSI storage area network, the method comprising the steps of:
   forming a target discovery layer interposed between and in communication with a host initiator and at least two target discovery protocols;
   receiving from each of the at least two target discovery protocols a list of target devices discovered by each of the at least two target discovery protocols;
   prioritizing among the at least two target discovery protocols for each discovered target device producing a prioritized list of target discovery protocols for each discovered target device, wherein the prioritizing is performed by the target discovery layer; and
   creating an enumerated target device register wherein the enumerated target device register associates each discovered target device with its prioritized list of target discovery protocols.

2. The method of claim 1 further comprising the steps of:
   receiving a request from the host initiator for target discovery protocols for a target device; and determining whether the requested target device is one of the discovered target devices.

3. The method of claim 2 further comprising the steps of:
   responsive to determining that the requested target device is one of the discovered target devices, providing the host initiator with the prioritized list of target discovery protocols associated with the discovered target device; and
   responsive to determining that the requested target device is not one of the discovered target devices, initializing each of the at least one target discovery protocols to find the requested target device.

4. The method of claim 3 wherein a pre-established priority list directs the order that the at least one target discovery protocols are initiated in their attempt to find the requested target device.

5. The method of claim 1 wherein the target discovery layer is in communication with the at least one target discovery protocol through a host bus adapter.

6. The method of claim 1 wherein the target discovery layer is in communication with the at least one target discovery protocol through a network driver.

7. The method of claim 1 wherein the at least one target discovery protocol includes static discovery, SendTargets discovery, Internet Storage Name Service discovery, Service Location Protocol discovery, or Directory Agent discovery.

8. At least one computer-readable medium containing a computer program product for target discovery and enumeration in an iSCSI storage area network, the computer program product comprising:
   program code for forming a target discovery layer interposed between and in communication with a host initiator and at least one target discovery protocol;
   program code for receiving from each of the at least one target discovery protocols a list of target devices discovered by that at least one target discovery protocol;
   program code for prioritizing among the at least one target discovery protocols for each discovered target device producing a prioritized list of target discovery protocols for each discovered target device; and
   program code for creating an enumerated target device register wherein the enumerated target device register associates each discovered target device with its prioritized list of target discovery protocols;
   program code for receiving a request from the host initiator for target discovery protocols for a target device;
   program code for determining whether the requested target device is one of the discovered target devices; and
   program code for providing the host initiator with the prioritized list of target discovery protocols associated with the discovered target device responsive to the program code determining that the requested target device is one of the discovered target devices.

9. The computer program product of claim 8, further comprising program code for initializing each of the at least one target discovery protocols to find the requested target device responsive to determining that the requested target device is not one of the discovered target devices.

10. The computer program product of claim 9 further comprising program code that directs the order that the at least one target discovery protocols are initialized in their attempt to find the requested target device based on a pre-established priority list.

11. The computer program product of claim 8 wherein the target discovery layer is in communication with the at least one target discovery protocol through a host bus adapter.

12. The computer program product of claim 8 wherein the target discovery layer is in communication with the at least one target discovery protocol through a network driver.

13. The computer program product of claim 8 wherein the at least one target discovery protocol includes static discovery, SendTargets discovery, Internet Storage Name Service discovery, Service Location Protocol discovery, or Directory Agent discovery.

14. A computer implemented method for initiating a discovery process of a specific target device and locating the specific target device in an iSCSI storage network, the method comprising:
   forming a target discovery manager between a host and a target, the target discovery manager including a target registry of at least one target device that is associated with at least one discovery protocol;
   determining that the specific target device is not located within the target registry; and,
   initiating each discovery protocol in a list of discovery protocols according to a preference order that has been determined by the target discovery manager until the specific target device has been located or until each discovery protocol in the list of discovery protocols has been initiated.

15. The method of claim 14, further comprising:

updating the target registry with the specific target device and at least one discovery protocol from the list of discovery protocols used to locate the specific target device when the specific target device is located during the initializing step.

16. The method of claim 14, wherein initiating each discovery protocol further comprises:

passing discovery of the specific target device to the target discovery manager if the discovery protocol in the list allows pass-through discovery; and using the target discovery manager to locate the specific target device.

17. The method of claim 16, further comprising after using the target discovery manager to locate the specific target device:

updating the target registry if the specific target device is located and successfully on-lined, or initiating a subsequent discovery protocol in the list of discovery protocols if the specific target device is not located or not successfully on-lined.

18. The method of claim 14, wherein the preference order is based on at least one characteristic of the specific target device.

19. The method of claim 14, wherein the preference order is pre-determined.

20. The method of claim 14, wherein each discovery protocol in the list of discovery protocols is initiated simultaneously.

* * * * *

UNITED STATES PATENT AND TRADEMARK OFFICE
CERTIFICATE OF CORRECTION

PATENT NO. : 7,673,077 B2
APPLICATION NO. : 11/371855
DATED : March 2, 2010
INVENTOR(S) : Gupta et al.

It is certified that error appears in the above-identified patent and that said Letters Patent is hereby corrected as shown below:

Column 5, line 11, delete "discovering" and insert therefor --discovery--.

Signed and Sealed this

Seventeenth Day of August, 2010

David J. Kappos
*Director of the United States Patent and Trademark Office*